United States Patent
Groß et al.

(10) Patent No.: US 12,117,027 B2
(45) Date of Patent: Oct. 15, 2024

(54) METHOD OF GLUING METAL PARTS

(71) Applicant: Braun GmbH, Kronberg (DE)

(72) Inventors: Dieter Groß, Mainz (DE); Marcel Denis Knorr, Frankfurt am Main (DE); Arne Schmidt, Euskirchen (DE)

(73) Assignee: Braun GmbH, Kronberg (DE)

( * ) Notice: Subject to any disclaimer, the term of this patent is extended or adjusted under 35 U.S.C. 154(b) by 558 days.

(21) Appl. No.: 17/017,327

(22) Filed: Sep. 10, 2020

(65) Prior Publication Data
US 2021/0079940 A1  Mar. 18, 2021

(30) Foreign Application Priority Data

Sep. 12, 2019 (EP) ..................................... 19197011

(51) Int. Cl.
*F16B 11/00* (2006.01)
*B23K 26/0622* (2014.01)
(Continued)

(52) U.S. Cl.
CPC ........ *F16B 11/006* (2013.01); *B23K 26/0624* (2015.10); *B23K 26/36* (2013.01);
(Continued)

(58) Field of Classification Search
CPC .. F16B 11/006; F16B 11/008; B23K 2101/20; B23K 2103/04; B23K 26/0624; B23K 26/36; B23K 26/355; B23K 26/3568; B23K 26/3584; C09J 5/02; C09J 2400/166; C09J 2301/416; A61C 17/22; B29C 66/30325; B29C 66/30322; B29C 66/028
(Continued)

(56) References Cited

U.S. PATENT DOCUMENTS 4,734,729 A    3/1988  Hertzel et al.
4,758,705 A *  7/1988  Hertzel ................... C21D 9/38
                                                    219/121.61
(Continued)

FOREIGN PATENT DOCUMENTS

CN    105479008 A    4/2016
CN    105537774 A    5/2016
(Continued)

OTHER PUBLICATIONS

Extended European Search Report and Search Opinion; Application Ser. No. 19197011.0; dated Mar. 23, 2020; 8 pages.
(Continued)

*Primary Examiner* — John L Goff, II
(74) *Attorney, Agent, or Firm* — Gregory S. Darley-Emerson

(57) ABSTRACT

A method of gluing a metal part to another part for use in a personal care device such as an electric toothbrush. The method includes steps of providing a metal, such as steel, part, and another, metal, part; treating a surface portion of the metal part with ultra-fast laser pulses having a pulse length in the femtosecond range, e.g., from about 1 femtosecond to about 990 femtoseconds, so that a surface layer of the metal surface is removed; applying an adhesive to the treated surface of the metal part or to a surface of the other part; and gluing the metal part and the other part together.

20 Claims, 5 Drawing Sheets

(51) Int. Cl.
  *B23K 26/36* (2014.01)
  *C09J 5/02* (2006.01)
  *B23K 101/20* (2006.01)
  *B23K 103/04* (2006.01)

(52) U.S. Cl.
  CPC ............. *C09J 5/02* (2013.01); *B23K 2101/20* (2018.08); *B23K 2103/04* (2018.08); *C09J 2400/166* (2013.01)

(58) Field of Classification Search
  USPC .......................................... 156/272.8, 273.3
  See application file for complete search history.

(56) References Cited

U.S. PATENT DOCUMENTS

| | | | |
|---|---|---|---|
| 8,618,204 | B2 | 12/2013 | Campbell |
| 2008/0213612 | A1 | 9/2008 | Starikov et al. |
| 2011/0240617 | A1 | 10/2011 | Imra |
| 2012/0207974 | A1* | 8/2012 | Maier .................. B32B 15/08 156/60 |
| 2013/0029290 | A1* | 1/2013 | Utsch ..................... A46B 9/04 433/147 |
| 2016/0046050 | A1* | 2/2016 | Ikeda ................... B32B 27/08 219/121.66 |
| 2016/0265570 | A1* | 9/2016 | Sabau ................. B29C 66/7212 |
| 2016/0318292 | A1 | 11/2016 | Jürgens et al. |
| 2020/0316721 | A1 | 10/2020 | Fang et al. |
| 2023/0366422 | A1 | 11/2023 | Gross |

FOREIGN PATENT DOCUMENTS

| | | | | |
|---|---|---|---|---|
| CN | 106079687 | A | 11/2016 | |
| CN | 108500455 | A | 9/2018 | |
| CN | 110202859 | A | 9/2019 | |
| DE | 102009017492 | A1 | 12/2010 | |
| DE | 102017103001 | A1 | 8/2018 | |
| DE | 102017210167 | A1 * | 12/2018 | ......... B23K 26/0624 |
| EP | 2253413 | A1 | 11/2010 | |
| EP | 2550938 | A1 | 1/2013 | |
| EP | 3881962 | A2 | 9/2021 | |
| JP | H10193158 | A | 7/1998 | |
| WO | 8607568 | A1 | 12/1986 | |
| WO | WO-2010011710 | A2 * | 1/2010 | ............ C09J 163/00 |
| WO | 2014087929 | A1 | 6/2014 | |
| WO | 2016129392 | A1 | 8/2016 | |
| WO | 2018149574 | A1 | 8/2018 | |
| WO | 2021048704 | A1 | 3/2021 | |

OTHER PUBLICATIONS

International Search Report and Written Opinion; Application Ser. No. PCT/IB2020/058174; dated Nov. 27, 2020; 13 pages.
CM05122FQ European Office Action for Application No. 19197011.0 dated Apr. 15, 2024; 5 pages.

* cited by examiner

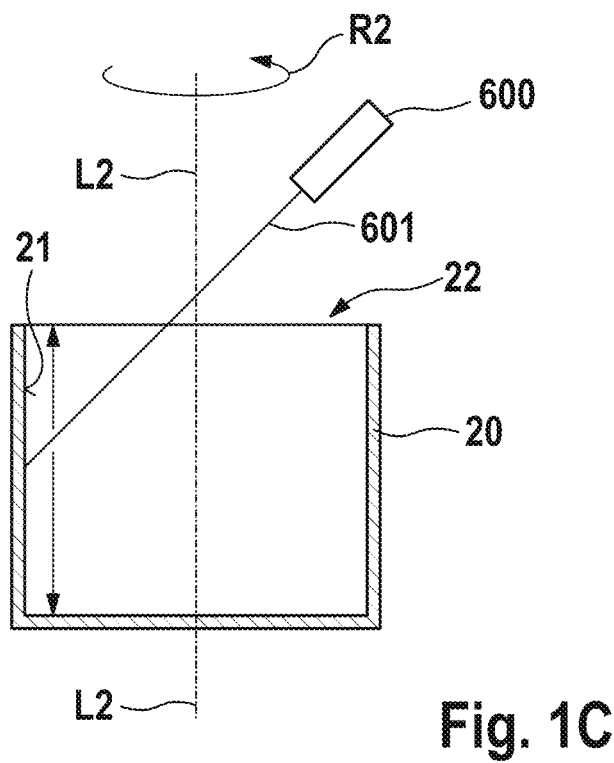
Fig. 1C
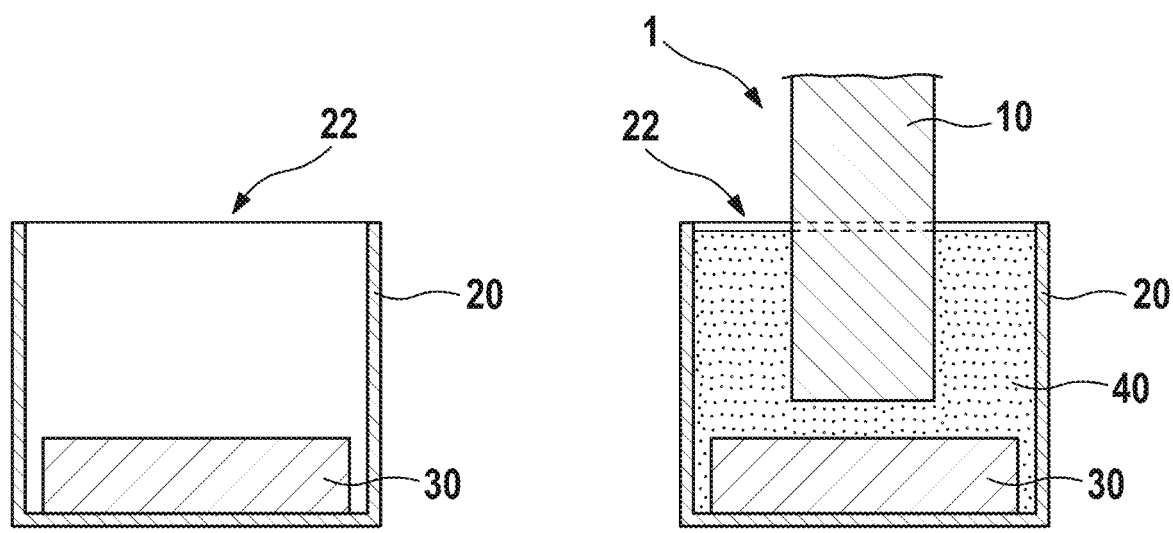
Fig. 1D
Fig. 1E

METHOD OF GLUING METAL PARTS

FIELD OF THE INVENTION

The present disclosure is concerned with a method of gluing a metal part to another part and which method in particular comprises a pre-treatment of the surface portion of the metal part to be glued to another part by applying laser pulses.

BACKGROUND OF THE INVENTION

It is known that a surface portion of a metal part that shall be glued to another part can be pretreated to enable a more durable adhesive bond. Such pretreatment may be cleaning of the metal surface with an alcoholic liquid, e.g. isopropanol. It may alternatively be ablating a surface layer of the metal surface, which surface layer comprises contaminants such as volatile organic compounds, e.g. oil, and a reaction layer that together deteriorate the durability adhesive joint. DE102009017492A1 generally discusses a pretreatment of a metal surface intended for being glued to another metal surface by means of nanosecond or picosecond laser pulses, e.g. with laser pulses having a length in the range between one and several hundred picoseconds.

It was found that such adhesive bonds, in particular if they are exposed to repeating mechanical stress and/or certain aggressive chemicals such as essential oils, do not always show the needed durability. Such described repeating mechanical load and/or aggressive chemical environment may occur, e.g., for personal care devices such as electric toothbrushes.

It is thus an object of the present invention to provide a method for gluing a metal part to another part that results in improved durability of the adhesive connection, in particular where the adhesive connection is subjected to a repeating load and/or where the adhesive connection becomes exposed to a wet environment comprising essential oils.

SUMMARY OF THE INVENTION

In accordance with one aspect a method is provided for gluing a metal part to another part, the metal part and the other part in particular intended for being used in a personal care device such as an electric toothbrush, wherein the method comprises the steps of providing a metal part, in particular a steel part, and another part, in particular another metal part; treating a surface portion of the metal part intended for being glued to the other part with ultra-fast laser pulses having a pulse length in the femtosecond range, in particular in the range of between 1 to 990 femtoseconds, so that a surface layer of the metal surface is removed; applying an adhesive to the treated surface of the metal part or to a surface of the other part; and gluing the metal part and the other part together.

In accordance with one aspect, a method is provided for manufacturing a personal care device, the method comprising the step of gluing a steel shaft into a metal cap, the method further comprising the steps of: providing the steel shaft and the metal cap sized to receive at least a tip region of the steel shaft; treating a surface portion of the steel shaft intended for being glued to the other part with ultra-fast laser pulses having a pulse length in the femtosecond range, in particular in the range of between 1 to 990 femtoseconds, so that a surface layer from the metal surface is removed; treating at least a portion of an inner surface of the metal cap intended for being bonded with the respective surface portion of the steel shaft with fast or ultra-fast laser pulses; applying an adhesive to the treated surface portion of at least one of the steel shaft and the metal cap; and fitting the metal cap onto the steel shaft and curing of the adhesive.

BRIEF DESCRIPTION OF THE DRAWINGS

FIG. 1C is a schematic depiction of a third example process step;

FIG. 1D is a schematic depiction of an optional fourth process step;

FIG. 1E is a schematic depiction of the glued together metal part and other part;

DETAILED DESCRIPTION OF THE INVENTION

Figure 1A:
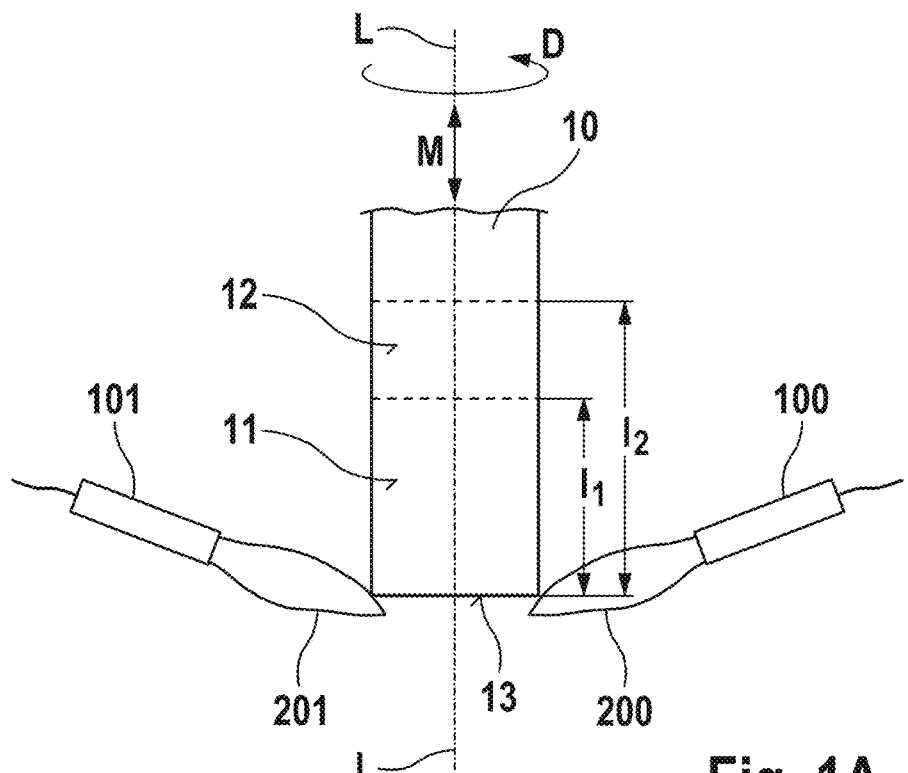
FIG. 1A is a schematic depiction of a first example process step of gluing one metal part to another part.

In the context of the present description, "personal care" shall mean the nurture (or care) of the skin and of its adnexa (i.e. hairs and nails) and of the teeth and the oral cavity (including the tongue, the gums etc.), where the aim is on the one hand the prevention of illnesses and the maintenance and strengthening of health ("care") and on the other hand the cosmetic treatment and improvement of the appearance of the skin and its adnexa or of the teeth and the oral cavity. It shall include the maintenance and strengthening of well-being. This includes skin care, hair care, and oral care as well as nail care. This further includes grooming activities such as beard care, shaving, and depilation. A "personal care device" thus means any device for performing such nurturing or grooming activity, e.g. (cosmetic) skin treatment devices such as skin massage devices or skin brushes; wet razors (with or without electronic or electric components such as a vibration device); electric shavers or trimmers; electric epilators; and oral care devices such as manual or electric toothbrushes, (electric) flossers, (electric) irrigators, (electric) tongue cleaners, or (electric) gum massagers. This shall not exclude that the proposed personal care device may have a more pronounced benefit in one or several of these nurturing or device areas than in one or several other of these areas.

In accordance with the present description, a metal part that shall be adhesively bonded with another part, in particular another metal part, is pretreated with ultra-fast laser pulses in the femtosecond range. It had been found that femtosecond laser pulses ablate contaminant and oxide layers (together forming the "surface layer") from the metal surface while the creation of heat affected zones is reduced, which provides a high wettability of the then activated metal surface so that an adhesive applied on the pre-treated surface will easily spread and contact the whole pretreated surface.

The herein described method of gluing a first metal part to another part had been identified by investigating improvements of adhesive metal bonding technologies in particular with a view on improved durability under recurring mechanical stress and alternatively or additionally with a view on a chemically relatively aggressive environment that in particular comprises essential oils or alcohols, such as would occur during use of a personal care device like an electric toothbrush. E.g. drive shaft parts that are coupled with a replaceable functional head to drive the functional head into motion typically have to endure cyclic load (i.e. repeating load) and may also get exposed to a saliva-toothpaste mixture (most toothpastes comprise one or several essential oils). Particularly suitable method steps were identified that individually tend to provide an improvement of the mentioned durability of the adhesive bond and that tend to show further improvement of the durability when used in combination. The surface purity (i.e. the pure active metal surface without contaminants and without passivation layers) is in particular of relevance if steel shall be bonded by means of an epoxy resin. It was found that chemical activity of the surface is in particular of high relevance in the presence of volatile organic compounds.

For example, it is known to clean metal surfaces with laser pulses, but it had so far not been reported to make use of laser pulses in the femtosecond range, i.e. laser pulses as short as 1 femtosecond to 999 femtoseconds, in particular in the range of below 990 fs, and further in particular in the range of below 950 fs, further in particular in the range of below 940 fs or 930 fs or 920 fs or 910 fs. A pulse length of about 900 fs may be considered. A lower range limit may be set to 50 fs or 100 fs or 200 fs or 300 fs or 400 fs or 500 fs or 600 fs or 700 fs or 800 fs. This shall not exclude any value in between the given examples. The ultra-fast laser pulses in the femtosecond range tend to sublimate the irradiated material due to the fast deposition of energy in the material. In contrast to longer laser pulses applying the same energy, where the material heats and melts, where so-called heat affected zones (HAZ) are generated, the femtosecond pulses lead to a different material ablation process with a reduced generation of observable HAZ. It is believed that this has a positive influence on the durability of the adhesive connection between the metal surface and the adhesive.

It has further been found that a metal part that may be used in a personal hygiene device may be contaminated with volatile organic compounds such as oil. While it is usually believed that pre-treatment of a metal surface with a laser ablation technique is sufficient to lay open an active metal surface for further bonding/gluing, it was found that the strongly increased wettability of such a pre-treated metal surface, in particular if pre-treated with ultra-fast laser pulses, leads to a wetting of the activated surface by volatile organic compounds present on the non-pre-treated surface portions adjoining the pre-treated surface portion in a short timeframe. Such fast contamination of the activated metal surface with volatile organic compounds leads to a problematic decrease of the long-term durability of the adhesive connection.

In contrast to known metal-surface pre-treatment techniques that involve only one treatment step, an additional pre-treatment with an air-pressure plasma is additionally proposed, which plasma pre-treatment in particular is performed prior to the laser pre-treatment. In particular, the plasma pre-treatment covers surface portions of the metal part that are adjoining the surface portion that will be pre-treated by laser ablation so that the volatile organic compounds on these later adjoining surface portions that are not removed become immobilized and cannot easily migrate to the laser pre-treated surface portion. The plasma pre-treatment cleans the surface on the one hand and on the other hand immobilizes remaining volatile organic compounds, e.g., by polymerizing and cracking of oil-based contaminants.

Thus, while the laser-pretreatment removes to some extent the active surface layer that remains after plasma cleaning, the plasma-pre-treatment at least reduces the contamination of the laser treated surface with remaining volatile organic compounds if the plasma pre-treatment has covered a surface area larger than the surface portion that is treated by ultra-fast laser pulses. As plasma pre-treatment and laser ablation pre-treatment have so far only be used in isolation and combination of both had been considered as economically inefficient and non-synergistic. The combination of both processes in the manner as discussed is considered a relevant and unusual step in accordance with the present disclosure. The immobilization of volatile organic compounds outside of the area that is pre-treated with femtosecond laser pulses by plasma treatment increased the durability of the adhesive connection under the mentioned circumstances even beyond the durability of only femtosecond laser pulse pre-treatment.

For sake of completeness, it is mentioned that also the other part, in particular if the other part is a metal part as well, may as well be treated by a combination of a preceding plasma pre-treatment and a subsequent laser pulse pre-treatment.

The metal part that is pre-treated with ultra-fast laser pulses may comprise a cylindrical section having an outer cylindrical surface that shall be pre-treated. E.g. the metal part may be a drive shaft of a motor that shall be used in a personal care device such as an electric toothbrush. In order to pre-treat the outer cylindrical surface of the metal part, the metal part may be rotated around the center axis of the cylindrical section. By way of example, it is assumed that the cylindrical section has a diameter of 3 mm and a height of 10 mm. The circumference of the cylindrical section is then 9.42 mm. A laser pulse having a diameter of 50 μm may be used so that by applying 250 overlapping parallel lines of laser pulses in length direction, the outer cylindrical surface of the example cylindrical section can be completely covered (the laser pulses would have a distance of about 37.7 μm in circumferential direction).

The laser pulses may be applied at a frequency of about 400 kHz and with a laser feed speed of 8000 mm/s. Laser pulses applied in length direction will then have a distance of 20 μm. Due to the overlap in length direction and also in circumferential direction, the total overlap of the laser pulse is about 70%. In the present example, a rotation of the cylindrical section around its length axis may be done at about 180 rotations/minute during the laser pre-treatment, which means that the laser beam having a feed speed of 8,000 mm/s generates laser treated lines on the metal part having a distance of about the 37.7 μm as previously mentioned.

In order to counteract the rotation of the cylindrical section, the laser may be scanned along a path that is not straight but that has a sand-clock type of shape, where the long extension of the sand-clock may be 10 mm or more in the present example and the small extension may be about 37 μm. If the laser were scanned long a straight line up and down, the laser ablation lines would follow a serrated path on the rotating cylinder section, which would cause a very strong overlap of the laser pulses at the respective tips of the serrated line. Counteracting the rotational motion by the sand-clock type path and moving the laser spot by the about 37 μm at the turning points essentially leads to straight and parallel laser ablation lines on the rotating cylindrical section.

In some embodiments, the cylindrical section of the pre-treated metal part represents an end portion of the metal part. The laser beam may then be scanned beyond the end of the cylindrical section, which longer way (e.g. in the example beyond the 10 mm) is then to be considered for the small distance motion, which would then be somewhat larger than the mentioned 37 μm. It is noted that the values discussed herein are just provided as an example and that the treated metal part may have any other geometry.

The energy applied per laser pulse may be set to 50 μJ, which means an average power of the laser of 20 W at a pulse frequency of 400 kHz. Generally, a Nd: YAG USPL laser may be used, which has a wavelength of 1030 nm. This shall not exclude that a laser source may be used having any other wavelength, in particular a wavelength in the range of between 930 nm and 1064 nm.

The application of ultra-fast laser pulses in essentially partially overlapping and essentially parallel lines leads to the formation of laser induced periodic surface structures (LIPSS). The laser may be linearly polarized. The LIPSS may have a spatial period of about the wavelength of the laser light (in the example thus a spatial period of about 1 μm). It is believed that these LIPSS tend to improve the durability of the adhesive bond that will form between the metal surface and the adhesive.

Table 1 lists the relevant values for the ultra-fast laser pulse pre-treatment and some ranges are provided that are considered as sensible, even though the below table shall not exclude that values outside of the proposed ranges can be used as well. Overall, the values may be varied rather to some extent as long as the light fluence stays within the proposed range.

TABLE 1

Example values for the ultra-fast laser pulse pre-treatment of the metal surface and proposed ranges. The various values may be tuned so that the light fluence stays within the proposed range.

| | Example Value | Proposed Range |
| --- | --- | --- |
| Laser wavelength | 1030 nm | 930 nm-1064 nm |
| Laser pulse length | 900 fs | 1 fs-990 fs |
| Laser frequency | 400 kHz | 100 kHz-1 MHz |
| Laser spot diameter | 50 μm | 30 μm-80 μm |
| Laser pulse energy | 50 μJ | 30 μJ-80 μJ |
| Light fluence | ≈6.6 J/cm$^2$ | 5.0 J/cm$^2$-8.0 J/cm$^2$ |
| Laser feed speed | 8,000 mm/s | 1,000 mm/s-20,000 mm/s |

In some embodiments, the metal part is a metal shaft, in particular a steel shaft, that is glued into a metal cap as other part. In this bonding process, a further element may be fixed in the metal cap, where the further element may be a permanent magnet such as a permanent magnet disk.

Generally, a primer such as a silane primer may be applied to the surface of the metal part (and additionally also to the surface of the other part) after the surface treatment with laser pulses, e.g. DELO SACO SIL E® available from company DELO Industrie Klebstoffe GmbH & Co. KGaA, Windach, Germany.

FIGS. 1A to 1E are schematic depictions that show successive example manufacturing steps in the pre-treatment and gluing of a metal part (here: a steel shaft) to another part (here: a metal cap) in accordance with the present disclosure.

In the schematic depiction of FIG. 1A, a metal part 10 is shown that realizes a front portion of a steel shaft that may be used in a drive unit of a personal care device, e.g. an electric toothbrush. In the present example, the shown front portion of the steel shaft is a cylinder, but this shall be considered as non-limiting. Two plasma sources 100, 101 generate atmospheric-pressure plasma jets 200, 201, respectively, that are applied on surface portions 11, 12, 13 of the metal part 10 to remove contaminants from the surface of the metal part 10. Either the metal part 10 may be moved along the direction M as indicated by an arrow in FIG. 1A or the plasma sources 100, 101 may be moved accordingly. In addition, the metal part 10 may be rotated around its center axis L as indicated by arrow D or the plasma sources 100, 101 may be rotated around the metal part 10. The pre-treatment by the atmospheric plasma 200, 201 covers the surface portions 11, 12, 13 of the metal part 10 that is larger than the surface portion 11 that is intended for being glued to another part.

In FIG. 1A, the surface portion 11 intended for being glued is the cylindric outer surface of the shaft having length 11. The plasma pre-treatment also covers the front surface 13 and an additional surface portion 12 of the metal part 10 that here means an additional surface portion of the cylinder adjoining the surface portion 11 intended for being glued to the other part. The front surface 13 of the steel shaft also adjoins the surface portion 11 that is intended for being glued to the other part. Due to the plasma pre-treatment, the outer surface portions 11, 12, 13 are cleaned from contaminants and volatile organic compounds (in particular oils) that are not removed by the plasma are essentially immobilized by polymerization or cracking.

Figure 1B:
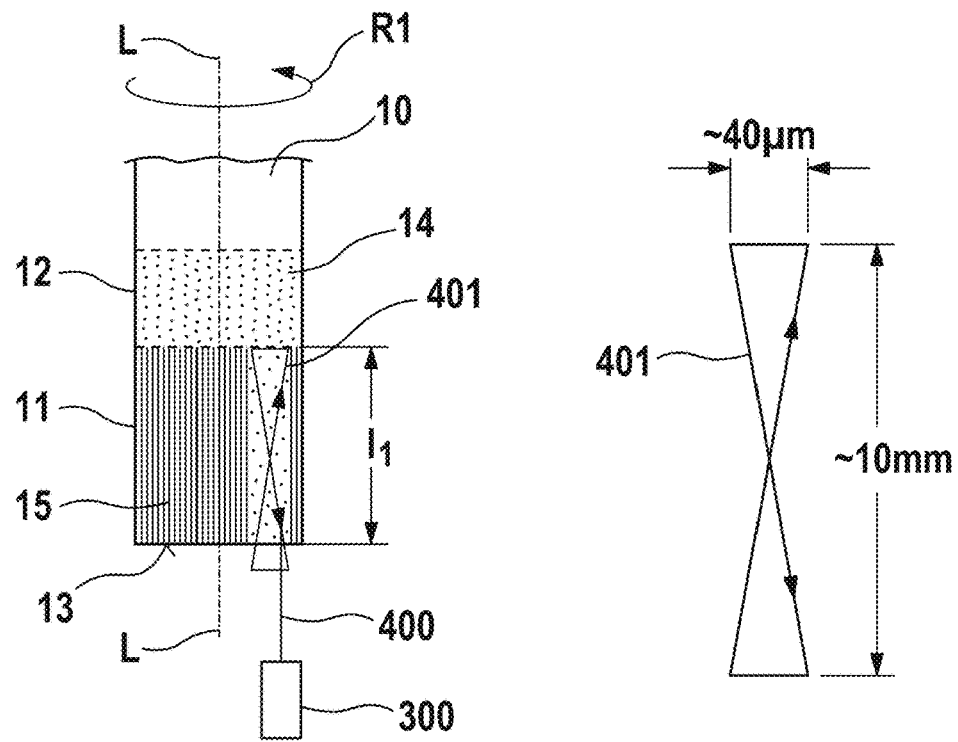
FIG. 1B is a schematic depiction of a second example process step.

In the schematic depiction of FIG. 1B, it is shown that a laser source 300 scans a laser beam 400 over the surface portion 11 of the rotating metal part 10, where the path 401 of the laser beam 400 is a sand-clock type path (magnification of path 401 is shown on the right-hand side of FIG. 1B) that counterbalances the rotation R1 of the metal part 10 around its center axis L and generates essentially parallel lines 15 on the outer cylindrical surface portion 11 intended for being glued to the other part. The laser source 300 may in particular be arranged to emit a pulsed laser beam 400 and the parameters of the pulsed laser beam 400 may be those that have been discussed in previous paragraphs, in particular as provided in Table 1, or the parameters may be adapted to the size of the metal part in accordance with the teaching as provided, which essentially means to achieve a certain fluence on the metal surface, i.e. a fluence in a range of between 5.0 J/cm$^2$ to 8.0 J/cm$^2$. It can be seen that the path 401 of the laser beam 400 extends beyond the end of the metal part 10.

A portion of the previously plasma-treated surface of the metal part 10 is not treated with laser pulses, namely surface portions 12 and 13 that are adjoining the surface portion 11 that is treated with laser pulses. Surface portions 12 and 13 may comprise immobilized volatile organic compounds 14 and an activation due to the plasma treatment. As was already explained, this pre-treatment sequence as explained with reference to FIGS. 1A and 1B essentially avoids mobile volatile organic compounds being close to the laser treated and activated pure metal surface that is laid open after the laser pre-treatment and thus fast recontamination of this laser-treated surface portion 11 is reduced. Example values that have been discussed in a previous paragraph are indicated with respect to the magnification of laser path 401. The length of the path 401 in this example is about 10 mm and the width of the path 401 is about 40 µm (the width value depending on the size of the metal part and on the rotation speed).

In the schematic depiction of FIG. 1C another part 20 is shown, which is here a cap-shaped part that in particular may be made from metal and that has a cap-shaped hollow 22. It is shown that a laser source 600 scans a laser beam 601 over the inner surface 21 of the cap-shaped part, where the cap-shaped part may be rotated around its center axis L2 (see rotation R2). While this is not shown, the other part 20 may as well be first treated with a plasma, e.g. an atmospheric-pressure plasma. The laser source 600 may apply fast or ultra-fast laser pulses in the nanosecond, picosecond or femtosecond range or the laser source 600 may emit a continuous wave laser beam.

The schematic depiction of FIG. 1D shows an optional step in which a further part 30 is positioned inside the cap-shaped hollow 22 of the cap-shaped part 20, where here the further part 30 may be a permanent magnet. The permanent magnet may be used for coupling purposes with a motion receiver of a functional head to which the drive shaft assembly 1 (see FIG. 1E) may be coupled by means of magnetic forces.

The schematic depiction of FIG. 1E shows the final drive shaft assembly 1 formed by pre-treated steel shaft 10, cap-shaped metal part 20, permanent magnet 30 and adhesive 40, which adhesive 40 was filled into the hollow 22 of the cap-shaped part 20 and the steel shaft 10 was inserted into the hollow 22 as well. The adhesive 40 may be an epoxide adhesive, in particular a two-component, room-temperature-curing epoxide adhesive. The further part 30 does not require any particular pre-treatment as it will be kept in its position due to the adhesive forces between the metal part 10 and the other part 20, but this shall not exclude that the further part may be pre-treated as well.

Figure 2A:
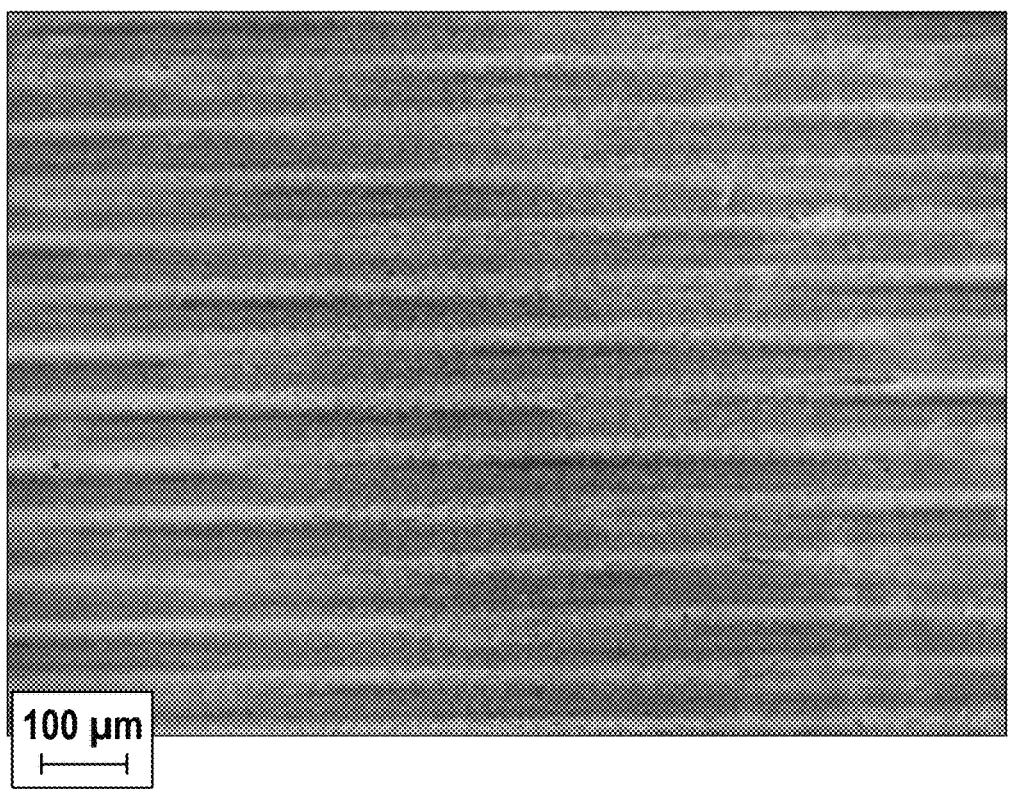
FIG. 2A is a SEM picture of a metal surface that was treated with femtosecond laser pulses along lines on a micrometer scale.
Figure 2B:
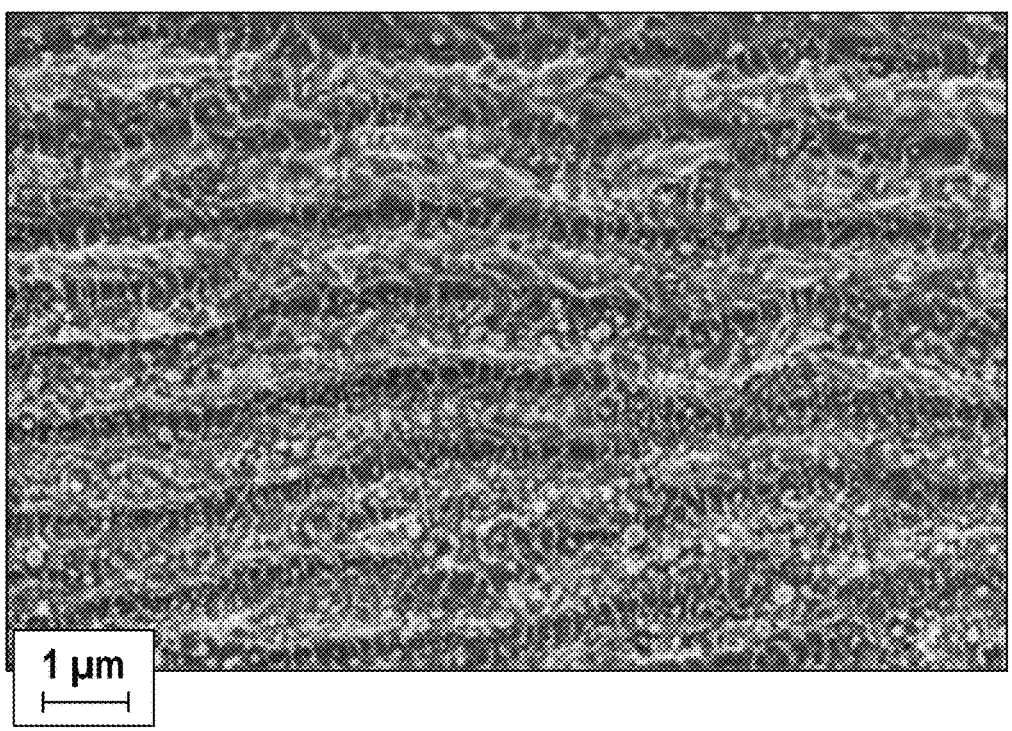
FIG. 2B is a SEM picture of a metal surface that was treated with femtosecond laser pulses along lines on a nanometer scale.

FIGS. 2A and 2B show SEM (scanning electron microscope) pictures of the surface of a metal part that was pre-treated with femtosecond laser pulses. FIG. 2A shows the micro-structures that result from the laser pre-treatment with femtosecond laser pulses, where linear and parallel lines can be seen. A 100 µm scale is shown. The FIG. 2B shows a 100 times magnification of a part of the surface shown in FIG. 2A, on which the resulting laser induced periodic surface structures (LIPSS) can be seen that have a size of about the laser wavelength that was used (which here had been 1030 nm). A 1 µm scale is shown. Such LIPSS structures do not occur in the same manner at lower pulse lengths (e.g. at 100 ps or 1 ns) due to the sublimation effect as discussed before that reduces the heat affected zones. It is believed that these surface structures have an effect on the durability of the adhesive connection.

Figure 3A:
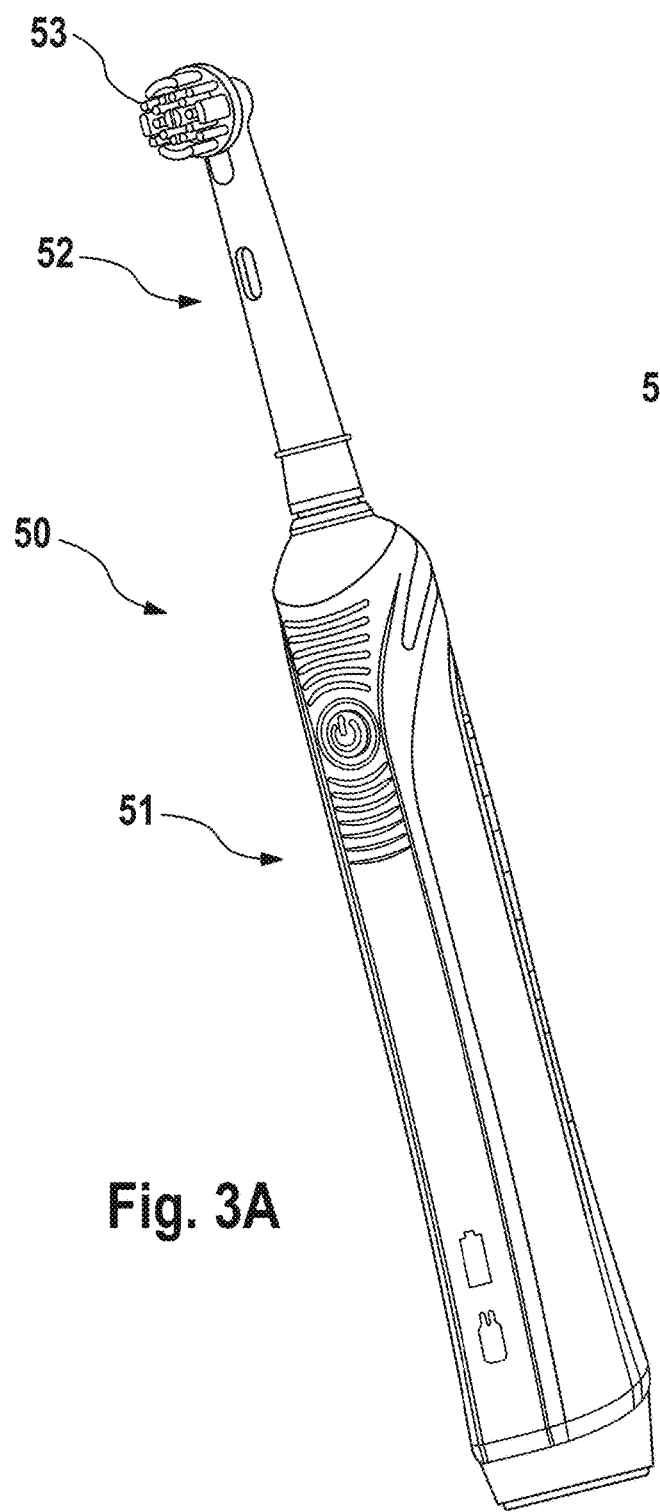
FIG. 3A is a depiction of an example personal care device.

FIG. 3A is a depiction of an example personal care device 50 realized as an electric toothbrush having a handle portion 51 and a treatment head 52, here realized as a replaceable brush head. The treatment head 52 comprises in the shown example a functional head 53 that can be driven into an oscillating-rotating motion relative to a housing of the treatment head 52.

Figure 3B:
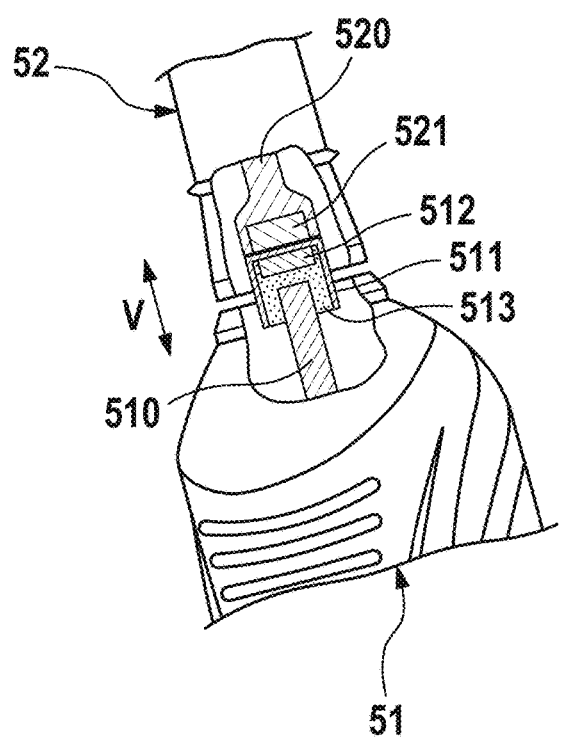
FIG. 3B is a magnification of the personal care device of FIG. 3A that is shown in a partially cut open state.

FIG. 3B is a magnification of a part of the personal care device 50 shown in FIG. 3A, where the magnified part is shown in a partly cut open state so that a coupling between a drive shaft 510 of the handle portion 51 with a motion transmitter 520 of the treatment head 52 can be seen. The drive shaft 510 is in operation driven into a linear reciprocating motion V, which linear reciprocating motion V is transferred via the motion transmitter 520 to the functional head 53 of the treatment head 52, where the linear reciprocating motion is transferred into an oscillating rotation of the functional head 53. The drive shaft 510 is a steel shaft and had been glued to a metal cap 511 as was described with reference to FIGS. 1A to 1E. A permanent magnet 512 is disposed in the metal cap 511 and an adhesive 513 fills the inner hollow of the metal cap 511. The permanent magnet 512 couples with, e.g., a magnetizable steel element 521 that is disposed at the opposing end of the motion transmitter 520. The adhesive connection created by the described method durably connects the steel shaft 510 and the metal cap 511 even under the periodic load acting on the metal cap due to the linear reciprocating motion V and also under an aggressive environment formed by toothpaste and saliva.

Figure 4:
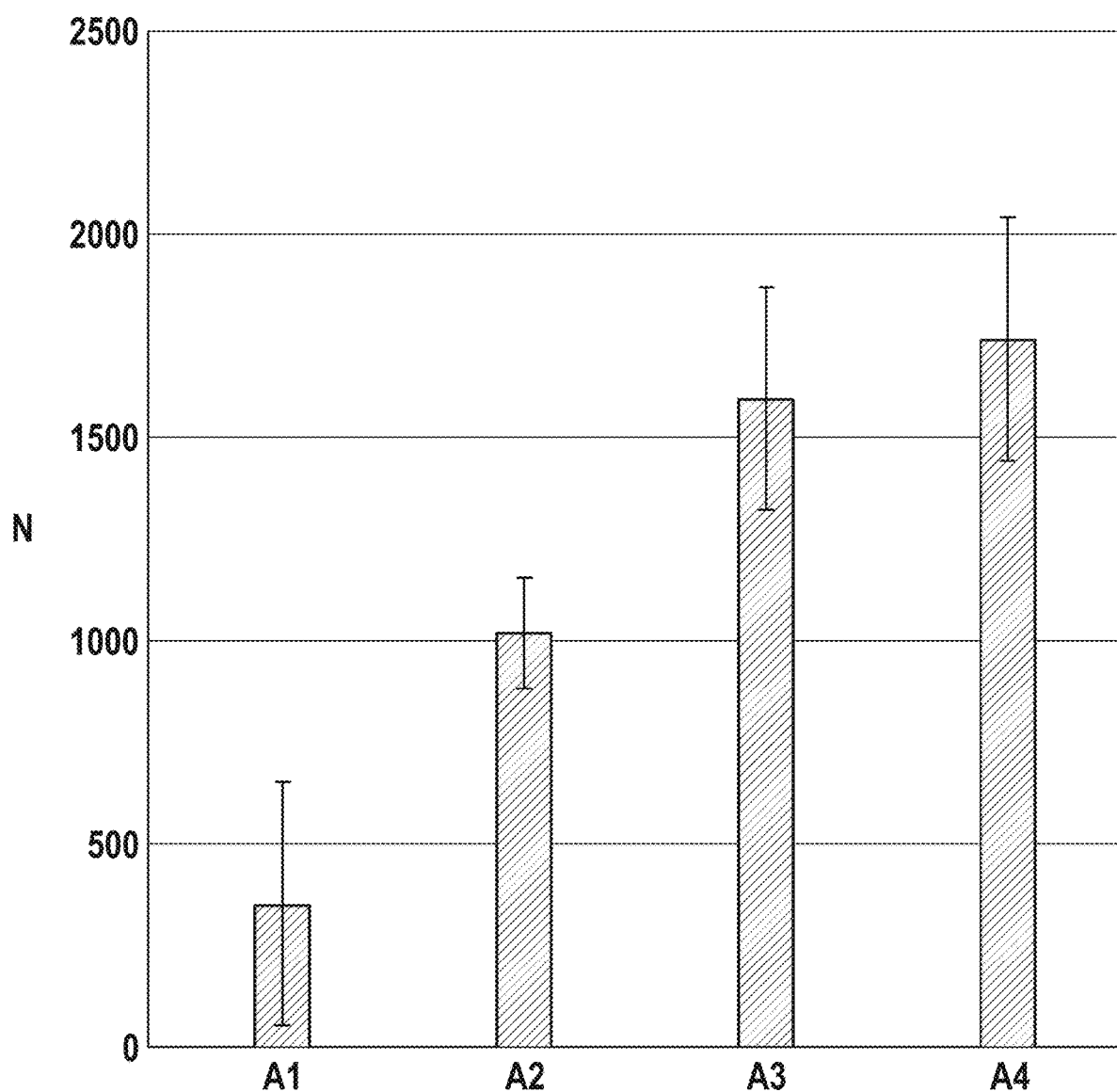
FIG. 4 shows a comparison of the durability of the adhesive connection between a metal part and another part for several process technologies.

FIG. 4 is a comparison of the experimentally determined durability of adhesive connections having the same geometry and the same adhesive for different pre-treatments. The values are given in N and indicate at which applied force value the adhesive connection broke in average (error bars are shown). A final drive shaft assembly comprising a steel shaft and a steel cap as shown in FIG. 1E was used for the experiments. The adhesive used in the experiments was DELO DUPOPDX CR8016 available from company DELO Industrie Klebstoffe GmbH & Co. KGaA, Windach, Germany. The measurements were done with a Zwick zwicki-Line Z2.5 material testing machine, available from company ZwickRoell GmbH & Co.KG, Ulm, Germany, with a maximum test load of 2.5 kN in tensile direction under norm climate conditions.

A1—shows the reference force value of 397±300.8 N for untreated metal shaft and metal cap.

A2—shows the value of 1018.4±137.7 N for treatment with nanosecond laser pulses.

A3—shows the value of 1593.2±272.9 for treatment with femtosecond laser pulses (only on the shaft—the cap was treated with nanosecond laser pulses).

A4—shows the value of 1741.8±322 N for the same treatment as for A3 with addition pre-treatment with plasma as explained with reference to FIG. 1A.

It can be seen that the treatment of the shaft surface with femtosecond laser pulses (a pulse length of 900 fs was used) improved the durability well above the durability obtained with nanosecond laser pulse treatment. The additional pre-treatment with a plasma as explained with respect to FIG. 1A even further improved the durability.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of gluing a first part to a second part, the first part having a metal surface, the method comprising the steps of:
   providing the first part and the second part, wherein the first part comprises a cylindrical drive shaft having a longitudinal axis;
   rotating the first part about the longitudinal axis;
   while rotating the first part, pre-treating a portion of the metal surface of the first part with an atmospheric-pressure plasma to at least immobilize layers of volatile organic compounds on the portion of the metal surface that is treated with the atmospheric-pressure plasma, wherein the portion of the metal surface that is treated with the atmospheric-pressure plasma comprises a first portion and a second portion that is adjoining the first portion;
   while rotating the first part, treating only the first portion of the metal surface of the first part with ultra-fast laser pulses having a pulse length in the femtosecond range of from 1 femtosecond to 990 femtoseconds, so that a surface layer of the first portion of the metal surface is removed, thereby forming a treated portion of the metal surface;
   applying an adhesive to the treated portion of the metal surface of the first part or to a surface of the second part; and
   gluing the first part and the second part together.

2. The method of claim 1, wherein the step of applying an adhesive includes applying an epoxide adhesive comprising a two-component, room-temperature-curing epoxide adhesive.

3. The method of claim 1, wherein the step of providing the first part and the second part comprises providing the second part having a metal surface, and wherein the method includes the step of treating at least a portion of the metal surface of the second part with laser pulses comprising ultra-fast or fast laser pulses having a pulse length in the femtosecond or picosecond or nanosecond range.

4. The method of claim 1, wherein the step of treating the surface with ultra-fast laser pulses includes forming laser-induced quasi-periodic or periodic surface structures.

5. The method of claim 4, wherein forming laser-induced quasi-periodic or periodic surface structures includes applying the laser pulses along a sand-clock type path.

6. The method of claim 1, wherein in the step of treating the first portion of the metal surface of the first part with ultra-fast laser pulses, a laser light fluence on a laser-treated surface portion is between 1 J/cm$^2$ and 10 J/cm$^2$.

7. The method of claim 1, wherein in the step of treating the first portion of the metal surface of the first part with ultra-fast laser pulses, an energy per pulse is between 20 µJ and 100 µJ.

8. The method of claim 1, wherein in the step of treating the first portion of the metal surface of the first part with ultra-fast laser pulses, a frequency at which the ultra-fast laser pulses are applied is between 100 kHz and 800 kHz.

9. The method of claim 1, wherein in the step of treating the first portion of the metal surface of the first part with ultra-fast laser pulses, a wavelength of a laser is between 930 nm and 1064 nm.

10. The method of claim 1, wherein the ultra-fast laser pulses have a spot diameter of from 30 µm to 80 µm.

11. The method of claim 1, wherein the laser pulses applied onto the surface portion overlap one another by about 70%.

12. The method of claim 10, wherein the ultra-fast laser pulses have a spot diameter of around 50 µm.

13. The method of claim 6, wherein in the step of treating the first portion of the metal surface of the first part with ultra-fast laser pulses, a laser light fluence on a laser-treated surface portion is between 5 J/cm$^2$ and 8 J/cm$^2$.

14. The method of claim 7, wherein in the step of treating the first portion of the metal surface of the first part with ultra-fast laser pulses, an energy per pulse is between 30 µJ and 80 µJ.

15. The method of claim 8, wherein in the step of treating the first portion of the metal surface of the first part with ultra-fast laser pulses, a frequency at which the ultra-fast laser pulses are applied is between 300 kHz and 500 kHz.

16. The method of claim 15, wherein the frequency at which the ultra-fast laser pulses are applied is about 400 kHz.

17. The method of claim 9, wherein in the step of treating the first portion of the metal surface of the first part with ultra-fast laser pulses, a wavelength of the laser is about 1030 nm.

18. A method of manufacturing a personal care device comprising the step of gluing a steel shaft into a metal cap, the method comprising the steps of:
   providing the steel shaft, having a longitudinal axis and a metal surface, and the metal cap having a longitudinal axis and sized to receive at least a tip region of the steel shaft;
   pre-treating a surface portion of the steel shaft, while rotating the steel shaft about the longitudinal axis of the steel shaft, with an atmospheric-pressure plasma to at least immobilize layers of volatile organic compounds on the portion of the steel shaft that is treated with the atmospheric-pressure plasma,
      wherein the surface portion of the steel shaft that is treated with the atmospheric-pressure plasma comprises a first portion and a second portion that is adjoining the first portion;
   treating only the first portion of the surface portion of the steel shaft, while rotating the steel shaft about the longitudinal axis of the steel shaft, with ultra-fast laser pulses having a pulse length in a femtosecond range of from 1 femtosecond to 990 femtoseconds, so that a surface layer from the first portion is removed;
   treating at least a portion of an inner surface of the metal cap with fast or ultra-fast laser pulses, while rotating the cap about the longitudinal axis of the cap;
   applying an adhesive to the treated surface portion of at least one of the steel shaft or the metal cap; and
   fitting the metal cap onto the steel shaft and curing the adhesive.

19. A method of manufacturing a personal care device, the method comprising the steps of:
   providing a shaft structured and configured for an electric oral-care device, the shaft having a longitudinal axis and comprising a tip portion having a metal outer surface;
   providing a cap having a metal inner surface and sized to receive at least the tip portion of the shaft; the cap having a longitudinal axis;

providing first and second laser sources structured and configured to produce fast and ultra-fast laser pulses having a pulse length of from 1 femtosecond to 990 femtoseconds;

rotating the shaft about the longitudinal axis of the shaft;

using the first laser source, treating at least a portion of the metal outer surface of the tip portion of the shaft with the fast or ultra-fast laser pulses to remove a surface layer from the portion of the metal surface of the tip of the shaft, thereby providing a treated portion of the metal outer surface of the tip of the shaft;

rotating the cap about the longitudinal axis of the cap;

pre-treating at least a portion of the inner metal surface of the cap, while rotating the cap about the longitudinal axis of the cap, with an atmospheric-pressure plasma to at least immobilize layers of volatile organic compounds on the portion of the inner metal surface of the cap that is treated with the atmospheric-pressure plasma, wherein the portion of the inner metal surface that is treated with the atmospheric-pressure plasma comprises a first portion and a second portion that is adjoining the first portion;

using the second laser source, treating only the first portion of the metal inner surface of the cap with the ultra-fast laser pulses, thereby providing a treated portion of the metal inner surface of the cap;

applying an adhesive to at least one of the treated portion of the metal outer surface of the tip of the shaft and the treated portion of the metal inner surface of the cap;

fitting the cap onto the tip portion of the shaft; and curing the adhesive.

20. The method of claim 19, wherein the step of providing a shaft structured and configured for an electric oral-care device comprises providing a drive shaft for an electric toothbrush.

* * * * *